(12) United States Patent
Kuivamäki

(10) Patent No.: US 10,060,508 B2
(45) Date of Patent: Aug. 28, 2018

(54) CHAIN SHACKLE

(71) Applicant: KONECRANES PLC, Hyvinkää (FI)

(72) Inventor: Ismo Kuivamäki, Helsinki (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 276 days.

(21) Appl. No.: 14/433,545

(22) PCT Filed: Oct. 7, 2013

(86) PCT No.: PCT/FI2013/050970
§ 371 (c)(1),
(2) Date: Apr. 3, 2015

(87) PCT Pub. No.: WO2014/057169
PCT Pub. Date: Apr. 17, 2014

(65) Prior Publication Data
US 2015/0260259 A1    Sep. 17, 2015

(30) Foreign Application Priority Data
Oct. 8, 2012   (FI) ...................... 20126051

(51) Int. Cl.
| F16G 15/04 | (2006.01) |
| B63B 21/18 | (2006.01) |
| B66C 1/34 | (2006.01) |
| B66D 3/26 | (2006.01) |
| B63B 23/58 | (2006.01) |

(52) U.S. Cl.
CPC .............. *F16G 15/04* (2013.01); *B63B 21/18* (2013.01); *B63B 23/58* (2013.01); *B66C 1/34* (2013.01); *B66D 3/26* (2013.01); *Y10T 24/3902* (2015.01)

(58) Field of Classification Search
CPC .............................. F16G 15/04; Y10T 24/3902
USPC ......................................... 114/200; 24/116 R
See application file for complete search history.

(56) References Cited

U.S. PATENT DOCUMENTS

| 2,652,018 A | * | 9/1953 | Griffith | ................... B63B 21/14 |
| | | | | 114/180 |
| 2,739,789 A | | 3/1956 | Smith | |
| 3,967,572 A | | 7/1976 | Lea | |
| 4,398,387 A | | 8/1983 | Bary | |

(Continued)

FOREIGN PATENT DOCUMENTS

| CN | 1323270 A | 11/2001 |
| CN | 1741960 A | 3/2006 |

(Continued)

*Primary Examiner* — Jack W Lavinder
(74) *Attorney, Agent, or Firm* — Birch, Stewart, Kolasch & Birch, LLP

(57) ABSTRACT

A invention relates to a chain shackle for fastening a hoist chain of a chain hoist to a hoisting member or the chain hoist. The chain shackle includes two identical shackle halves installable against each other to work together in such a manner that they form between them a first space for one chain loop or chain loop half of the hoist chain to lock it against the hoisting direction or force. The first space is open in a first direction in the longitudinal direction of the chain shackle. A second space is connected to the first space and intended for a second hoist chain loop that is coupled with the first chain loop or is to be coupled with a chain loop half. The second space is open in both longitudinal directions of the hoist chain.

14 Claims, 4 Drawing Sheets

(56) References Cited

U.S. PATENT DOCUMENTS

| | | | |
|---|---|---|---|
| 4,842,127 A * | 6/1989 | Zenker | B65G 19/24 |
| | | | 198/712 |
| 5,644,821 A | 7/1997 | Zaguroli, Jr. | |
| 6,019,057 A | 2/2000 | Hystad | |
| 6,431,102 B1 | 8/2002 | Askestad et al. | |
| 2010/0007159 A1 | 1/2010 | Henrion | |
| 2011/0099968 A1 | 5/2011 | Mülle | |

FOREIGN PATENT DOCUMENTS

| | | |
|---|---|---|
| CN | 101400921 A | 4/2009 |
| CN | 102052428 A | 5/2011 |
| DE | 38 07 700 C1 | 7/1989 |
| DE | 10 2005 044 061 A1 | 4/2007 |
| EP | 0 672 609 A1 | 9/1995 |
| FR | 2149016 | 3/1973 |
| GB | 2488363 A | 8/2012 |
| JP | 60-26487 U | 2/1985 |
| WO | WO 2004/087554 A1 | 10/2004 |

\* cited by examiner

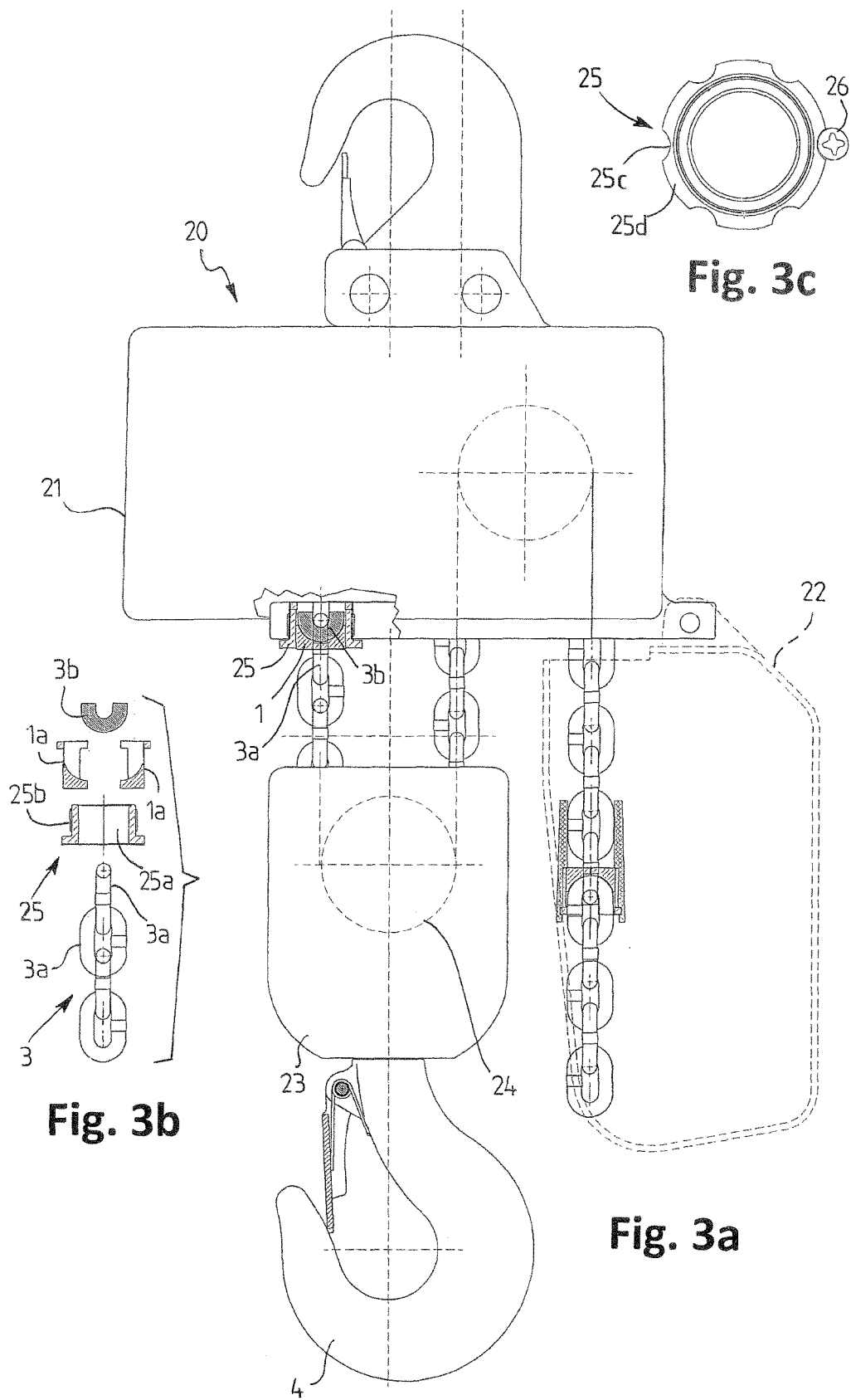

CHAIN SHACKLE

BACKGROUND OF THE INVENTION

The invention relates to a chain shackle for fastening the end of a hoist chain of a chain hoist to a hoisting member or the chain hoist, the hoist chain comprising chain loops fastened to each other with the planes formed by the adjacent chain loops mainly at a 90° angle to each other.

In chain hoists, the end of the hoist chain must be locked in two places depending on the implementation of the hoist. In single-chain hoists, a chain shackle is necessary in the hook cylinder of the hoisting hook. In a double-chain hoist, the end of the chain needs to be locked in the frame of the chain hoist. In addition, a type of lock piece is needed in the chain bag to operate a limit switch and/or prevent the chain from being run out of the chain hoist completely. Often all three places have their own locking elements.

A general manner of locking the chain to the hook cylinder and chain hoist frame is to use a pin that passes through the chain loop and supports itself against the hook cylinder and chain hoist frame. The pin solution has the problem that the pin is a double-supported "beam" subjected to bending and its tension level becomes high because it is not possible to push a pin with a very large diameter through the chain loop. In addition, during chain change, the pin may be set in a different position than originally. The direction of the load of the pin may then become disadvantageous so that the side of the pin that was originally subjected to compression is now subjected to tensile stress. Especially if a notch has formed in the pin during compression by a chain loop, the pin solution becomes dangerous. In the pin solution, the surface pressure between the chain loop and pin is disadvantageous due to the geometrics, because, in principle, it is a point contact.

Often shape-locking elements are used in locking the chain, either directly moulded into the hook cylinder or to separate parts that in turn lock into the hook cylinder or chain hoist frame by shape-locking.

SUMMARY OF THE INVENTION

It is an object of the invention to primarily reduce the stress directed to the chain and chain shackle. Another object of the invention is to avoid a situation in which many different elements are needed to lock the chain.

The set objectives are achieved by a chain shackle of the invention that is characterised in that the chain shackle comprises two identical shackle halves installable against each other to work together on a plane parallel to the longitudinal direction of the halves and the hoist chain in such a manner that they form between them a first space for one chain loop or chain loop half of the hoist chain to lock it against the hoisting direction or force, the first space being open in a first direction in the longitudinal direction of the chain shackle, and a second space connected to the first space and intended for a second hoist chain loop that is coupled with the first chain loop or is to be coupled with a chain loop half, the second space being open in both longitudinal directions of the hoist chain and turned 90° in relation to the first space about the longitudinal direction of the hoist chain.

Preferred embodiments of the invention are disclosed in the dependent claims.

The solution of the invention provides the following advantages, for instance:

The chain shackle of the invention allows for a lower hook cylinder structure and thus a more advantageous measurement from the hoisting hook to a suspension hook.

The hoisting loop halves created when the chain is cut will be utilized.

The chain loop half, on which the hoist chain with its load settles, experiences minimal bending stress, because the shackle halves bring the support point almost directly below the chain loop half.

During the installation of a new chain, a chain loop half cannot be positioned incorrectly.

The surface pressure (Hertz pressure) between the hoist chain and the chain loop half is smaller than the surface pressure between a straight pin, round or oval in cross-section, and the chain loop, and at the same time, the surface pressure between the chain loop half and the next chain loop is the same as that of all other loop contacts.

The chain shackle of the invention is a multipurpose object, because it is usable in a chain hoist in all locations requiring a chain shackle.

When the chain hoist is made double-chained, with the chain shackle of the invention, it does not matter which way the chain comes out of the hoist (horizontal or vertical hoisting loop first), because the chain shackle can be turned into the correct position. This is not the case, if the end of the chain is locked with a pin passing through the last chain loop, for instance. If in the pin solution, the position happens to be wrong, the chain needs to be reinstalled into the correct position.

When using only one type of chain shackle that also comprises two identical shackle halves, it is possible to manufacture large quantities, which means that inexpensive manufacturing methods can be used and unit costs made low.

LIST OF FIGURES

The invention will now be described in more detail by means of a few preferred exemplary embodiments, with reference to the attached drawings, in which FIG. 1a is a front view (from the inside of the chain shackle) of a shackle half of the chain shackle according to the invention;

FIG. 2a shows a single-chain chain hoist, in which the chain shackle formed of the shackle halves shown in FIGS. 1a and 1b is used in connection with the hoisting hook;

FIG. 2b is an exploded view of the locking shown in FIG. 2a;

FIG. 3a shows a double-chain chain hoist, in which the chain shackle formed of the shackle halves shown in FIGS. 1a and 1b is used in fastening the hoist chain to the frame of the hoist;

FIG. 3b is an exploded view of the locking shown in FIG. 3a;

FIG. 3c shows a sleeve-like locking nut shown in FIGS. 3a and 3b from below;

FIG. 4a is a more detailed representation of the chain shackle shown in FIGS. 2a and 3a at the end of the chain in a chain bag; and FIG. 4b is an exploded view of the locking shown in FIG. 4a.

DETAILED DESCRIPTION OF THE INVENTION

Figure 1G:
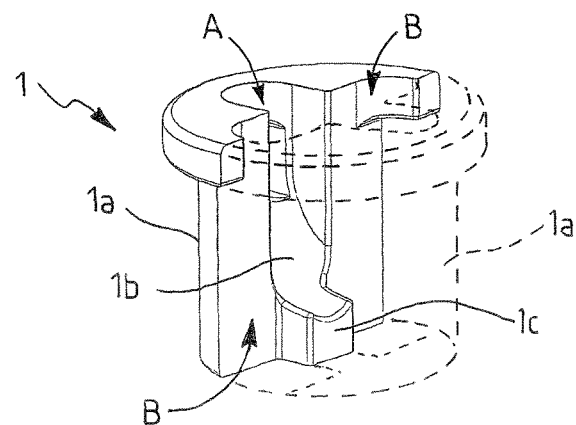
FIG. 1g is an outline of the cooperation between the shackle halves.
Figure 1B:
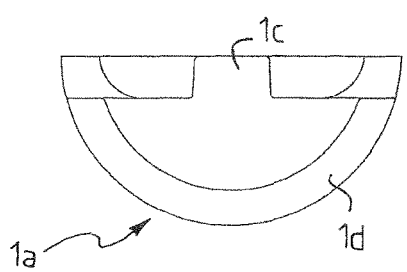
FIG. 1b shows the shackle half according to FIG. 1a from below.
Figure 1A:
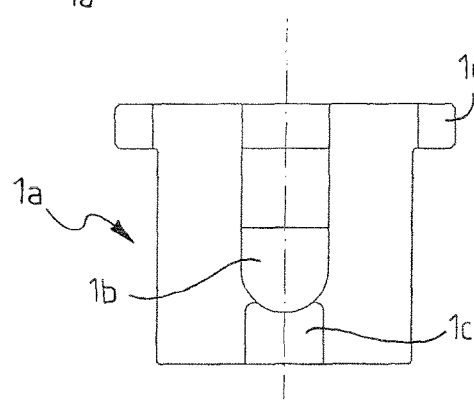
FIG. 1c shows the shackle half according to FIG. 1a from the top.
FIG. 1d shows the shackle half according to FIG. 1a from the side.
FIG. 1e shows the shackle half according to FIG. 1a in cross-section.
FIG. 1f is a perspective view of the shackle half shown in the above figures.
Figure 1D:
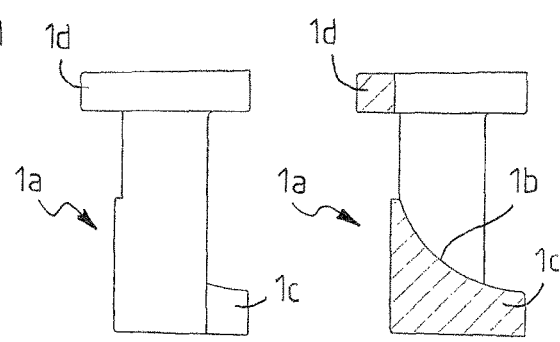
Figure 1E:
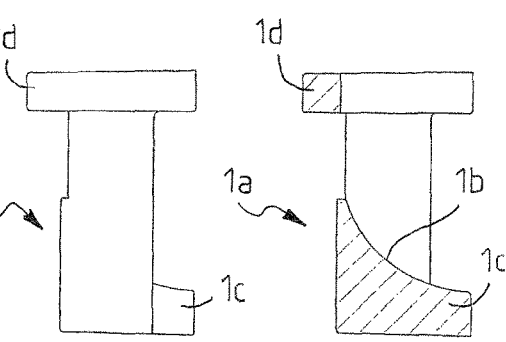
Figure 1C:
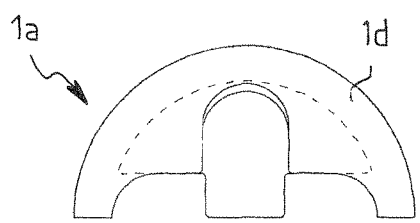
Figure 1F:
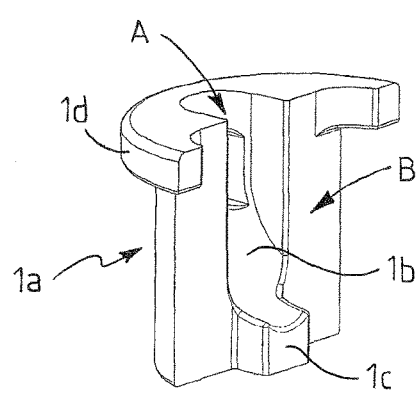
Figures 2A, 2B:
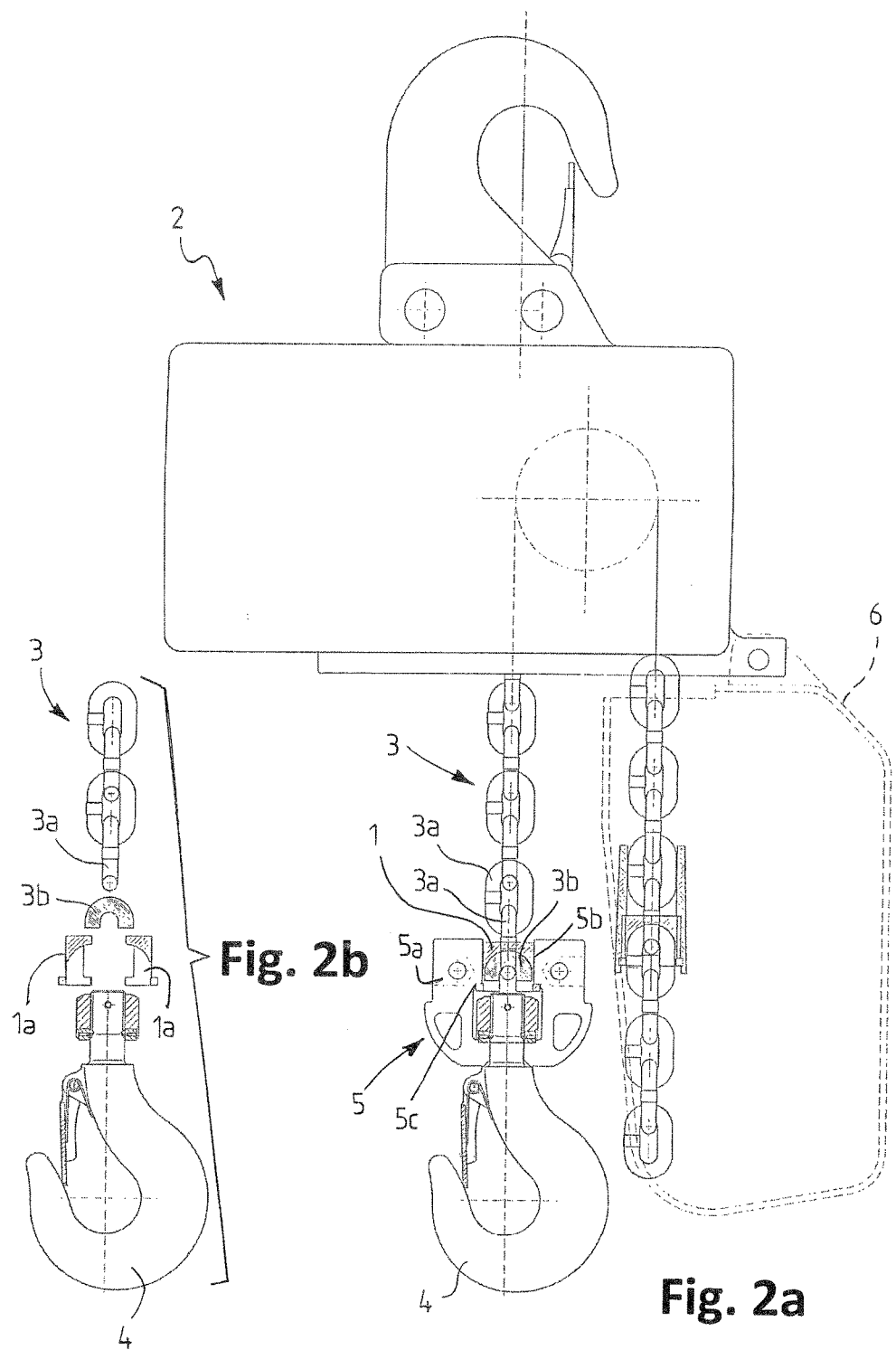

The drawings show a chain shackle 1 of the invention for fastening the end of a hoist chain 3 of a chain hoist 2, 20 to a hook cylinder 5 of a hoisting hook 4 of a single-chain hoist 2 according to FIGS. 2a and 2b, to a frame 21 of a double-chain hoist 20 according to FIGS. 3a and 3b, and to chain bags 6, 22 of the chain hoists 2, 20 according to FIGS. 2a, 2b and 3a, 3b. The hoist chain 3 in question comprises chain loops 3a attached to each other with the planes formed by adjacent chain loops 3a primarily at a 90° angle to each other, as is the case in any chain of this type.

With reference to FIGS. 1a to 1f, in particular, the chain shackle 1 comprises two identical shackle halves 1a that are installable against each other to work together on a plane parallel to the longitudinal direction of the halves and the hoist chain 3 in such a manner that they form between them a first space A for one chain loop 3a or chain loop half 3b of the hoist chain 3 to lock it against the hoisting direction or force, the first space A being open in a first direction in the longitudinal direction of the chain shackle 1, and a second space B connected to the first space A and intended for a second chain loop 3a of the hoist chain 3 that is coupled with the first chain loop 3a or is to be coupled with the chain loop half 3b, the second space B being, in this example, open to both longitudinal directions of the hoist chain 3 and also partially open to the sides of the chain shackle 1 on opposite sides of the chain shackle 1 over a selected distance from the end of the chain shackle 1 that is on the opposite side to the opening direction of the first space A. The second space B is naturally turned 90° in relation to the first space A about said longitudinal direction in a manner corresponding to the position of the adjacent loops 3a of the hoist chain 3.

Figures 4A, 4B:
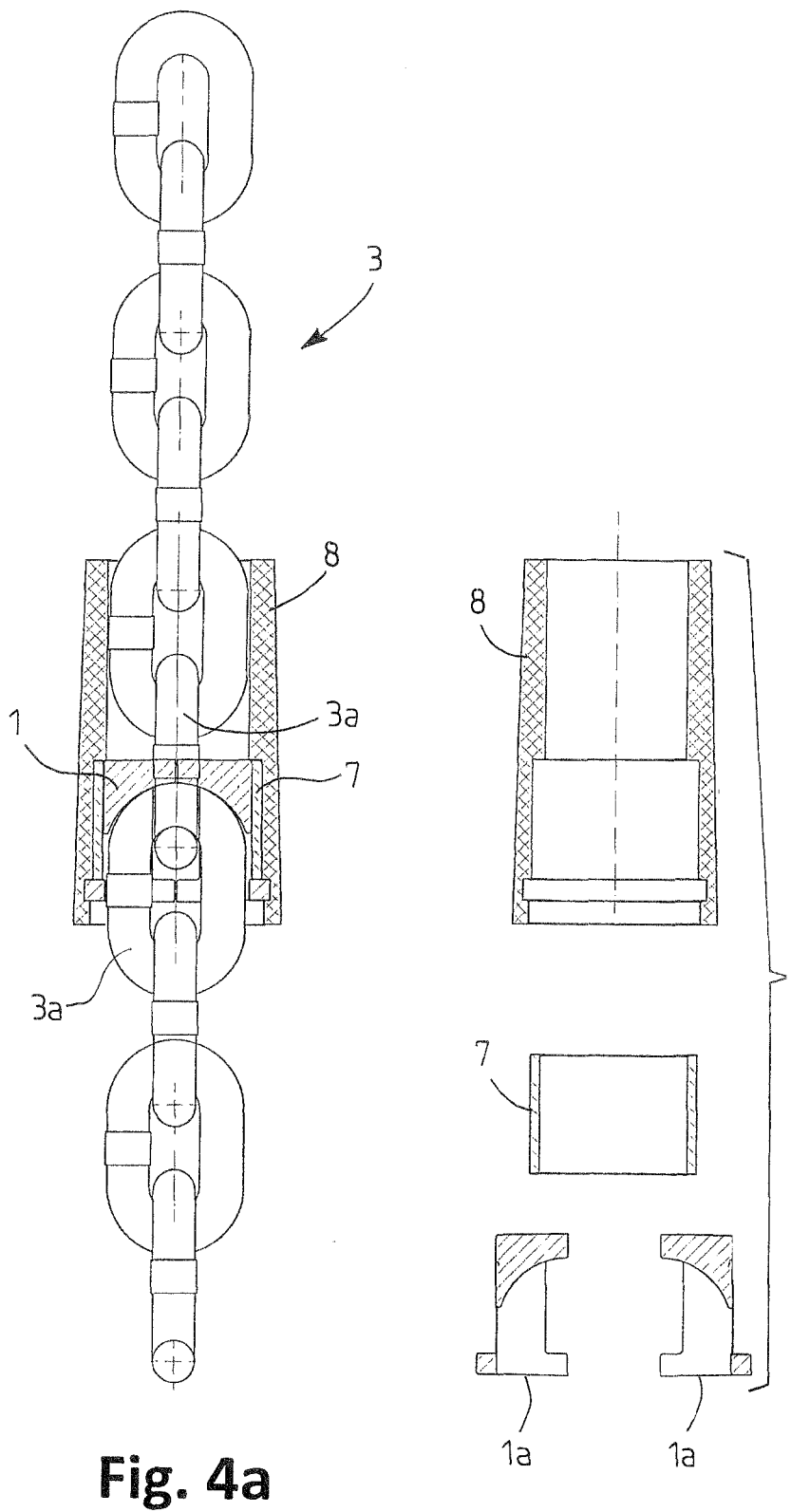

The first space A comprises a recessed groove 1b on each shackle half 1a and, extending across the second space B, a cam 1c, on the surface of which the groove 1b continues so that the shapes of the groove 1b and cam 1c surfaces substantially correspond to the shape of the outer surface of the chain loop 3a or chain loop half 3b. Thus, the essential thing with this structure is that, if necessary, the hoist chain 3 may continue in both directions from the chain shackle 1, as seen in FIGS. 4a and 4b, in particular.

In an appropriate manner, the shackle halves 1a form together a rotationally symmetrical entity, as shown in the drawings.

In addition, on the outer edge of each shackle half 1a, on the end that is on the side of the open end of the first space A, there are means for supporting the chain shackle 1 to the fastening location. When the chain shackle is of the rotationally symmetrical type shown in the drawings, these means for supporting the chain shackle 1 to the fastening location are most preferably a flange structure 1d surrounding the outer edges of the shackle halves 1a.

FIGS. 2a and 2b show, how the end of the hoist chain 3 is fastened to the hook cylinder 5 formed by two identical cylinder halves 5a of the hoisting hook 4 of the single-chain hoist 3 with the chain shackle 1 of the invention. A cut half 3b of a chain loop is passed through the intact hoisting loop 3a at the end of the hoist chain 3 and the shackle halves 1a are set on both sides of this entity. The formed combination is closed between the cylinder halves 5a, which have semi-cylindrical recesses 5b corresponding to the shape of the outer surface of the shackle halves 1a for shape-locking the shackle halves 1a inside them. The above flange structure 1d of the chain shackle 1 is supported against corresponding machining 5c formed in the recesses 5b of the cylinder halves 5a and, thus, receives the load in the hoist chain 3. The load of the hoist chain 3 is also directed to the grooves 1b and cams 1c of the first space A of the chain shackle 1, the load-bearing surface area of which is considerably larger than that of the earlier pin solutions.

FIGS. 3a and 3b show the fastening of the hoist chain 3 end to the bottom part of the frame 21 of a double-chain hoist 20. In this structure, the hook cylinder 23 has a chain pulley 24, around which the hoist chain 3 coils and fastens at its other end to the bottom part of the frame 21. For this fastening, a sleeve-like locking nut 25 has been arranged, the inside of which forms a space 25a corresponding to the outline of the chain shackle 1 for the chain shackle 1 and for arranging the shackle halves 1a in cooperation, and the outer surface of which has threads 25b for fastening the chain shackle 1 supported against the locking nut 25 to corresponding threads of the frame 21. The locking nut 25 together with the chain shackle 1 receives the load directed to the hoist chain 3. The locking nut 25 can also be locked stationary with a clamping screw 26 of FIG. 3c that supports itself in a recess 25d of a circumferential flange 25c of the locking nut 25.

Finally, FIGS. 4a and 4b show how the chain shackle 1 of the invention is also designed to fasten the hoist chain 4 from a point at a selected distance from its end to the chain bags 6 and 22 of the hoists 2 and 20 shown in FIGS. 2a, 2b and 3a, 3b, and in order to bring the shackle halves 1a into cooperation, a sleeve 7 having an inner surface corresponding to the outline of the chain shackle is arranged around the shackle halves, and another sleeve 8 made of an elastic material is arranged on top of the sleeve 7 for operating a limit switch and/or for preventing the hoist chain 3 from being driven completely out of the hoist 2; 20.

The description of the invention is only intended to illustrate the basic idea of the invention. A person skilled in the art may, however, implement the details of the invention in several alternative ways within the scope of the attached claims.

The invention claimed is:

1. An apparatus for fastening a hoist chain of a chain hoist to a hoisting member or the chain hoist, the hoist chain comprising chain loops fastened to each other with planes formed by adjacent chain loops mainly at a 90° angle to each other, wherein the apparatus comprises:
   a chain shackle, wherein the chain shackle comprises:
      two identical shackle halves installable against each other to work together in a longitudinal direction of the halves, wherein the two identical shackle halves form between them a first space configured to encompass a first chain loop or a chain loop half of the hoist chain and to lock the first chain loop or the chain loop half against a hoisting direction or force, the first space being open in the longitudinal direction of the chain shackle, and a second space communicating with the first space and configured to encompass and lock a second hoist chain loop of the hoist chain that is coupled with the first chain loop or is to be coupled with the chain loop half, wherein the second space is configured to be open in a longitudinal direction of the hoist chain and is configured to be turned 90° in relation to the first space about the longitudinal direction of the hoist chain, and a locking nut, wherein an inside of the locking nut forms a space corresponding to an outline of the chain shackle for bringing the shackle halves into cooperation, and wherein an outer surface of the locking nut has threads for fastening the chain shackle that is supported against the locking nut to a fastening site.

2. The apparatus as claimed in claim 1, wherein the first space comprises a groove in each shackle half and, extending across the second space, a cam, wherein the groove continues on a surface of the cam, and wherein shapes of groove and cam surfaces are configured to essentially correspond to a shape of an outer surface of the first chain loop or the chain loop half.

3. The apparatus as claimed in claim 1, wherein the second space is partially open to sides of the chain shackle on opposite sides of the chain shackle along a selected distance from an end of the chain shackle, and wherein the end of the chain shackle is on a side opposite to an opening direction of the first space.

4. The apparatus as claimed in claim 1, wherein the shackle halves form together a rotationally symmetrical entity.

5. The apparatus as claimed in claim 1, wherein an element located at an outer edge of each shackle half at an end that is on an open end side of the first space is configured to support the chain shackle against the fastening site.

6. The apparatus as claimed in claim 5, wherein the element located on the outer edge of each shackle half is a flange structure surrounding the outer edges of the shackle halves.

7. The apparatus as claimed in claim 1, wherein the locking nut is designed for cooperation with the chain shackle.

8. The apparatus as claimed in claim 1, wherein the chain shackle is designed for fastening directly to a recess that is formed in the fastening site and for locking the shackle halves to each other.

9. An apparatus for fastening a hoist chain of a chain hoist to a hoisting member or the chain hoist, the hoist chain comprising chain loops fastened to each other with planes formed by adjacent chain loops mainly at a 90° angle to each other, wherein the apparatus comprises:

a chain shackle comprising two identical shackle halves installable against each other to work together in a longitudinal direction of the halves, wherein the two identical shackle halves form between them a first space configured to encompass a first chain loop or a chain loop half of the hoist chain and to lock the first chain loop or the chain loop half against a hoisting direction or force, the first space being open in the longitudinal direction of the chain shackle, and a second space communicating with the first space and configured to encompass and lock a second hoist chain loop of the hoist chain that is coupled with the first chain loop or is to be coupled with the chain loop half, wherein the second space is configured to open in a longitudinal direction of the hoist chain and is configured to be turned 90° in relation to the first space about the longitudinal direction of the hoist chain, wherein the chain shackle is designed for fastening at a selected distance from an end of the chain, and a first sleeve to surround the shackle halves and having an inner surface corresponding to an outline of the chain shackle, wherein the inner surface of the first sleeve is arranged to bring the shackle halves into cooperation, wherein another sleeve made of an elastic material is arranged to surround the first sleeve.

10. The apparatus as claimed in claim 9, wherein the first space comprises a groove in each shackle half and, extending across the second space, a cam, wherein the groove continues on a surface of the cam, and wherein shapes of groove and cam surfaces are configured to essentially correspond to a shape of an outer surface of the first chain loop or the chain loop half.

11. The apparatus as claimed in claim 9, wherein the second space is partially open to sides of the chain shackle on opposite sides of the chain shackle along a selected distance from an end of the chain shackle, and wherein the end of the chain shackle is on a side opposite to an opening direction of the first space.

12. The apparatus as claimed in claim 9, wherein the shackle halves form together a rotationally symmetrical entity.

13. The apparatus as claimed in claim 9, wherein an element located on an outer edge of each shackle half at an end that is on an open end side of the first space is configured to support the chain shackle against a fastening location.

14. The apparatus as claimed in claim 13, wherein the element located on the outer edge of each shackle half is formed of a flange structure surrounding the outer edges of the shackle halves.

* * * * *